United States Patent [19]

Dholakia

[11] 4,443,871
[45] Apr. 17, 1984

[54] STYLUS LOWERING, LIFTING AND CLEANING APPARATUS

[75] Inventor: Anil R. Dholakia, East Windsor, N.J.

[73] Assignee: RCA Corporation, New York, N.Y.

[21] Appl. No.: 338,379

[22] Filed: Jan. 11, 1982

[51] Int. Cl.³ .............................................. G11B 3/58
[52] U.S. Cl. .................................................. 369/71
[58] Field of Search .......................................... 369/71

[56] References Cited

U.S. PATENT DOCUMENTS 3,189,351  6/1965  Hathaway .............................. 369/71
4,166,623  9/1979  Nanbu et al. ......................... 274/1 R
4,285,524  8/1981  Hughes et al. ......................... 369/71

FOREIGN PATENT DOCUMENTS 55-28587  2/1980  Japan .................................... 369/71

Primary Examiner—Steven L. Stephan
Attorney, Agent, or Firm—E. M. Whitacre; J. S. Tripoli; R. G. Coalter

[57] ABSTRACT

In a record playback system, which includes a carriage within which a stylus arm is mounted, it is desired to clean the stylus tip from time to time. The apparatus according to the present invention lowers and lifts the stylus so as to effect stylus-record engagement and disengagement and in addition the same apparatus cleans the stylus tip during the lowering-lifting cycle.

6 Claims, 4 Drawing Figures

STYLUS LOWERING, LIFTING AND CLEANING APPARATUS

The present invention relates generally to apparatus for performing the combined functions of lowering, lifting and cleaning a signal pickup stylus.

There are several applications where it is desirable to provide apparatus for automatically bringing a signal pickup stylus into and out of contact with a record medium. In these same applications it may also be desirable to clean the stylus tip to get rid of accumulated dust and debris which might otherwise obscure the desired signal recovery. Such applications may arise in the context of audio and audio-video systems for recovering information recorded on a disc record medium.

One such application is the capacitive type video disc system. Here, audio and video information is recorded as geometric variations in a spiral information track on a disc record having conductive properties. An electrode is mounted on the pickup stylus. A variable capacitance is formed between the stylus electrode and the conductive property of the disc record. As the record is rotated, the signal recovered at the stylus electrode is related to the varying capacitance, which is directly related to the signal recorded in the information track. The recovered signal is then processed for application to a television receiver for playback of the recorded video and audio information. One example of this type of video disc system is described in U.S. Pat. No. 3,842,194 issued to J. K. Clemens.

In the video disc systems, the information track density is generally quite high. For example, one commercially available system uses a spiral grooved information track with a groove density of nearly 10,000 grooves per inch. It is generally the practice with such high density records (both grooved and flat records) to mount the signal recovery stylus in a carriage which is driven in some timed relationship to the rotation of the turntable. It is also known that the mechanism which causes stylus-record engagement and disengagement can be mounted within the carriage. See for example U.S. Pat. No. 4,266,785 which issued to T. W. Burrus on May 15, 1981.

It is also known that the signal to noise ratio, or, more generally, the quality of the recovered signal is affected by such things as dust and debris adhering to the pickyp stylus. The dust referred to here can be microscopic in size. The debris can also be microscopic particles which come out of the information track as the record is being played.

In U.S. Pat. No. 4,285,524, which issued to L. M. Hughes et al. on Aug. 25, 1981, an elaborate system is disclosed for cleaning a video disc player stylus tip each time a record is recovered from the player. As described in Hughes et al., each time an empty protective cover is inserted in the player and subsequently withdrawn (with the record enclosed) the stylus is momentarily lowered and a pad swings by the lowered stylus to wipe off any dust or debris. The Hughes et al. system has proven to be quite effective, but, it is complex in operation, has a high parts count and is, therefore, a relatively expensive stylus cleaner.

The present invention attempts to achieve the desirable results of Hughes at al. in a much simpler and less costly manner and goes even further by providing a mechanism which will lower and lift the stylus as well as clean the stylus tip. One of the features of this invention is that all of the mechanical parts of the apparatus can be easily located within the carriage thereby freeing up space which might otherwise be used in the player for a stylus cleaner while at the same time reducing the overall parts count of previously separated lowering-lifting mechanisms and cleaning mechanisms.

In accordance with the present invention apparatus is provided in a system for recovering information from a record medium. The system includes a pickup arm with a stylus mounted on one end of the arm. The pickup arm is mounted in a carriage which is driven during playback. An opening is provided in the carriage bottom to permit the stylus to pass out of the confines of the carriage and make contact with the record for signal recovery. The apparatus providing comprises a means for lowering and lifting the stylus arm to effect engagement and disengagement of the stylus with the record medium and for cleaning the stylus during the lowering-lifting cycle.

Figure 1:
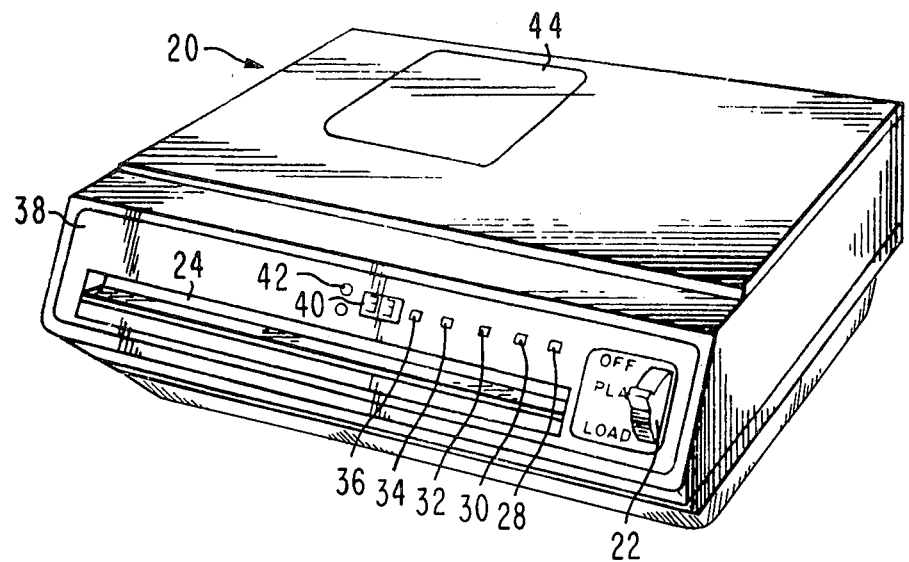
FIG. 1 is a perspective view of a video disc player which uses the present invention.

Shown in FIG. 1 is a video disc player 20 incorporating the stylus lowering-lifting-cleaning mechanism in accordance with the present invention. A function lever 22 on the front side of the player is subject to disposition in any one of three positions OFF, PLAY and LOAD/UNLOAD. A caddy entry door closes a caddy input slot 24 when the function lever 22 is disposed in the OFF and PLAY positions. In the LOAD/UNLOAD position of the function lever 22, the caddy entry door is opened to permit insertion of a full video disc caddy (not shown) into the player to load an enclosed record therein. A pushbutton 28 is provided to dispose the player in the "PAUSE" mode to allow the viewer to interrupt the program for as long as desired without missing any of the program content. In the PAUSE mode, the pickup stylus is raised and its lateral motion is arrested. A set of pushbuttons 30, 32, 34 and 36 are arranged on the instrument panel 38 to dispose the player in any one of four "SEARCH" modes, i.e., rapid access (forward/reverse) and visual search (forward/reverse), to permit the viewer to quickly locate a precise section of the prerecorded program. During rapid access, the pickup stylus is lifted, and rapidly moved sideways. In visual search, the pickup stylus is rapidly moved sideways while in engagement with the record. A digital LED readout 40 provides an indication of playing time and other functions, such as PAUSE, LOAD/UNLOAD and END-OF-PLAY, etc. A pair of tally lights 42 are operated to provide an indication of the record side subject to play, e.g., "SIDE 1" and "SIDE 2". A removable door 44 is disposed on the cover of the player to provide access to a stylus cartridge 46, shown in FIG. 2, so that it can be changed when required.

As is evident from the brief description of the video disc player 20, there are several modes of operation where the stylus is lowered and lifted to effect engagement and disengagement of the stylus and the record. Therefore it is probable that a stylus which is cleaned during the lowering-lifting cycle will be cleaned more often than one which is cleaned during the record retrieval cycle.

Figure 2:
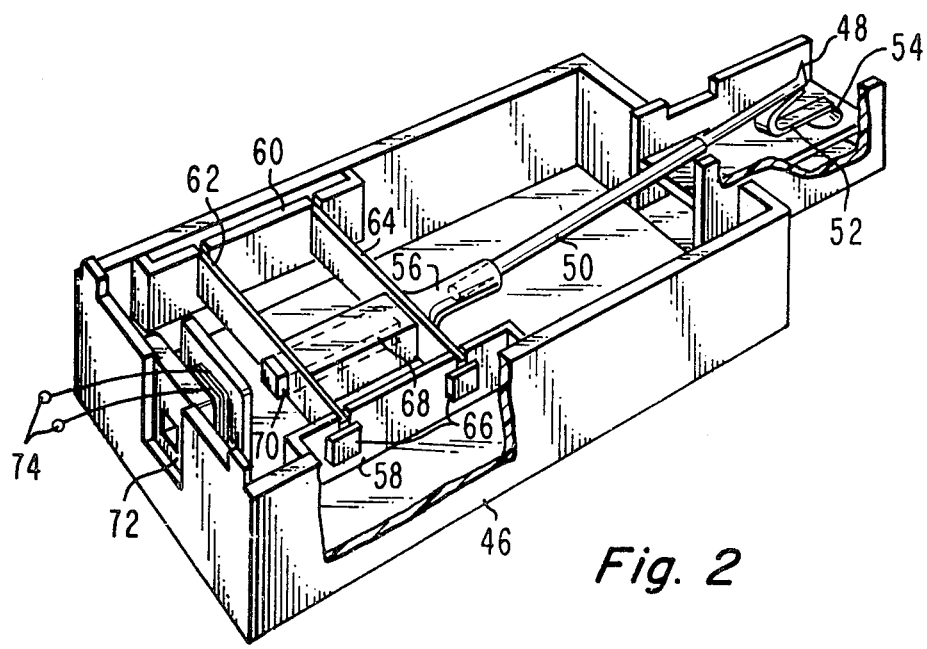
FIG. 2 is a perspective view of a stylus cartridge which is used in the player of FIG. 1.

FIG. 2 shows a stylus cartridge 46 which is placed in the carriage of the player 20 via the door 44. The cartridge 46 comprises a stylus 48 positioned at one end of a stylus arm 50. A flylead or leaf spring 52 is connected at one end to the electrode on stylus 48, and, the other end of flyhead 52 is connected to terminal 54. The other end of stylus arm 50 is connected to a compliant coupler 56 which is in turn secured to a stylus arm-magnet suspension system.

Suspension support elements 58 and 60 are rigid and integral to the cartridge enclosure 46. Two parallel ribbon members 62 and 64 comprising a flexible material such a butyl rubber are lightly stretched between the support members. The ribbons are located and oriented by insertion in respective slots in the support members and restrained from passing through by end sections 66 which are respectively integral to the ribbons. A central element 68 is secured midway between the support elements 58 and 60 to the ribbons 62 and 64. The central element has a cavity for reception of a longitudinal permanent magnet 70. Magnet 70 is fixedly secured within the central element with its interpolar axis substantially normal to the planes formed by the flat surfaces of the ribbons and with its rear or leftmost pole preferably extending beyond ribbon 62. A magnetic field producing coil 72 responsive to velocity correction signals (also known as armstretcher signals) applied to signal input terminals 74, is coaxially aligned with the interpolar axis of magnet 70 and fixedly secured to the cartridge 46 or alternatively secured to the carriage assembly (not shown) into which the cartridge 46 is received.

The compliant coupler 56 is secured to the front or rightmost face of ribbon 64. Compliant coupler 56 has a cavity in its rightmost end for receivably securing the longitudinal stylus arm 50 so that the stylus arm is in substantial coaxial alignment with the interpolar axis of the magnet 70 when in the nominal play position.

Compliant coupler 56 permits the stylus arm 50 to pivot thereabout precluding axial misalignment of the magnet 70 with the coil 72 due to vertical translations of the stylus during record playback.

U.S. patent application Ser. No. 238,983, filed on Feb. 27, 1981 for G. Riddle can be referred to for a more detailed explanation of the operation of the cartridge shown in FIG. 2.

Figure 3:
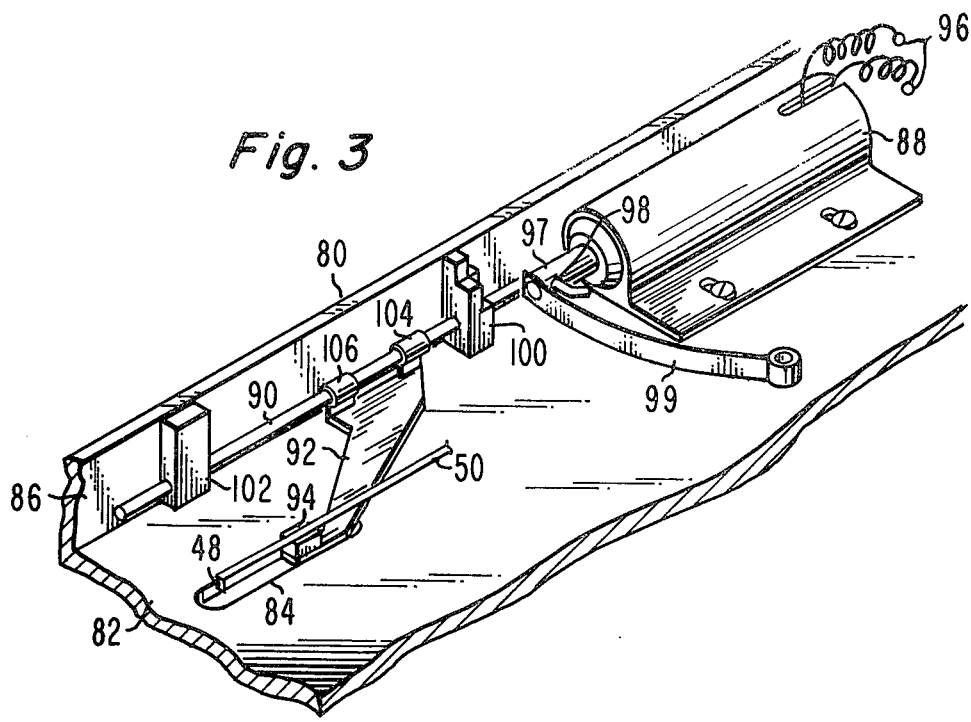
FIGS. 3 and 4 are perspective views of a preferred embodiment and second embodiment, respectively, of lowering-lifting-cleaning mechanisms in accordance with the present invention.

Referring now to FIG. 3, a portion of the carriage 80 which is in the player 20 and receives the cartridge 46 is shown. For purposes of describing the present invention the cartridge 46 is not shown in FIG. 3 but rather only the stylus arm 50.

The carriage 80 includes a bottom 82 having an elongated hole 84 to allow the stylus 48 to be lowered down onto the record during playback. Carriage 80 further comprises a sidewall 86 along which is mounted the means for lowering, lifting and cleaning the tip of stylus 48.

The basic elements of the system in accordance with the present invention comprise a solenoid 88, an elongated member 90, a support arm 92 and a cleaning pad 94.

Solenoid 88 has a pair of terminals 96 to which signals are applied when it is desired to lower the stylus arm 50 and thereby lower the stylus 48 to effect stylus-record engagement. The application of signals to terminals 96 draws the movable metal arm 97 of solenoid 88 inward or to the right in FIG. 3. Arm 97 is spring loaded through the operation of leaf spring 99 so that arm 97 is normally extended in the absence of applied signals. Leaf spring 99 is fixed at one end of arm 97 and fixed at the other end to the other sidewall (not shown) of carriage 80. The spring force created by the arc in leaf spring 99 tends to extend arm 97.

Elongated member 90 is hooked into metal arm 97 through the hole 98. Support blocks 100 and 102, each being fixedly attached to the carriage 80, have through holes to support the elongated member 90 and permit free movement of member 90. Support block 102 may not be required when member 90 is sufficiently stiff so as not to sag.

The support arm 92 has two tabs 104 and 106 which are crimped onto member 90 so that the support arm 92 will experience travel in consonance with the travel of member 90. Tabs 104 and 106 extend down in a generally parallel relationship with respect to sidewall 86. The main portion of support arm 92 extends generally parallel to the bottom 82 of carriage 80 and just above the upper surface of the bottom 82. At the end of the main portion of support arm 92 there is located a cleaning pad 94 which is adapted to receive the stylus pickup arm 50. Pad 94 has a width which is substantially the same as the width of the elongated hole 84. Pad 94 may be formed from rayon-velvet type material.

In operation, the lowering-lifting-cleaning apparatus has an initial condition whereby the metal arm 97 is fully extended (toward the left in FIG. 3), thereby causing members 90 and 92 to be positioned toward the leftmost end of their travel, and, thereby having the stylus 48 resting on the cleaning pad 94. Thus, in the absence of signals being applied to terminals 96 the stylus is out of contact with the record. This is a desirable initial set up since the system will return to this position in the event of a power failure by virtue of the spring loading of metal arm 97.

Now, assume that a record is loaded into the player 20 and the lever 22 is placed in the play position. A signal is sent out to terminals 96 to energize the solenoid 88. The movable arm 97 is drawn in by the electromagnetic forces which overcome the spring forces and elongated arm 90 and support arm 92 move toward the right. As support arm 92 moves toward the right the pickup arm 50, which is free to pivot about its far end (not shown) slides on pad 94. As stylus arm 50 slides on pad 94 the stylus 48 is slowly and gently lowered onto the record.

If a "pause" or "rapid search" command is now given (or any other command calling for stylus-record disengagement), the applied signals to terminal 96 are slowly removed and the spring loading of arm 97 causes arm 97 to extend outward with a corresponding movement being applied to member 90 and support arm 92. Eventually stylus 48 will come to rest within the confines of the carriage, on cleaning pad 94.

Since the concern is the cleaning of very small particles of dust and debris from stylus 48 very little movement of the pad 94 relative to the stylus 48 when pad-stylus contact is made is required to effect cleaning of the stylus tip.

Thus, the apparatus shown in FIG. 3, all of which is found within the confines of the carriage 80, provides the combined functions of lowering, lifting and cleaning the stylus 48. The cleaning action takes place every time the stylus 48 contacts the pad 94 during the lowering-lifting cycle.

Figure 4:
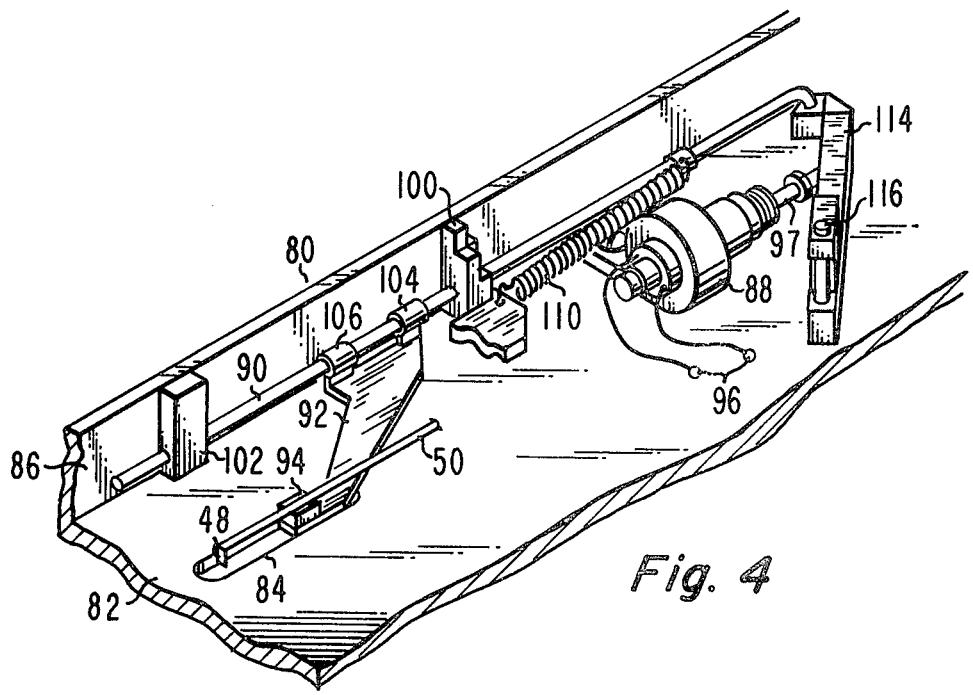

Another embodiment of the present invention is shown in FIG. 4. Like elements have the same designations as previously shown and described. In the embodiment of FIG. 4 a spring 110 has been added to provide the spring return force. Spring 110 is secured to the carriage on one end and to the elongated member 90 at the other end of the spring. Elongated member 90 is pivotally hooked onto one end of lever 114. The other end of lever 114 is pivoted about pin 116 which is fixed to the carriage bottom 82. The metal arm 97 is made to contact lever 114 along one side thereof.

In the embodiment of FIG. 4, when signals are applied to terminals 96 to command the lowering of the stylus 48, arm 97 extends outward or to the right. This action causes the lever 114 to pivot in a clockwise direction about pin 116. When lever 114 is pivoted in the manner described, spring 110 becomes extended. As member 90 moves toward the right the support arm 92, which is fixed to member 90, also moves toward the right and the pad 94 moves toward the right. In this way, the point of contact between the pad 94 and the stylus arm 50 moves toward the right and the stylus 48 is gently lowered onto the record.

When the signals applied to terminals 96 are removed, preferably in a controlled fashion, the metal arm 97 is slowly retracted as the electromagnetic forces are reduced and spring 110 starts to return to its normally non-extended state. As this happens, lever 114 rotates about pin 116 in a counter-clockwise direction and member 90 moves to the left in FIG. 4. Pad 94 moves to the left in consonance with the movement of member 90 and therefore the contact point between the pad 94 and the arm 50 moves toward the left. Eventually, the stylus 48 will come to rest on the pad 94 and the stylus will thus have been lifted and wiped.

The combination of the pivoted lever 114 and the metal arm 97 of solenoid 88 function to magnify or amplify the drive provided by the solenoid 88. That is, for a relatively small movement of metal arm 97 the free end of lever 114 can be made to move a relatively large amount. However, the basic lowering-lifting-cleaning action is the same in FIGS. 3 and 4.

The invention described herein presents a group of elements, all of which can be placed in the confines of a carriage, for providing the functions of lowering, lifting and cleaning a stylus. This invention may be useful in applications such as audio record players as well as video disc players and may be equally useful with grooved as well as flat records. In fact, the invention may proove useful in any application where it is desired to raise and lower a stylus and where it is desired to automatically clean the stylus tip from time to time.

What is claimed is:

1. In a system for recovering information from a record medium, said system including a pickup arm having a stylus mounted at a first end thereof, said pickup arm being mounted in a radially translatory carriage, said carriage having an opening to permit said stylus to pass out of the confines of said carriage to make contact with said record medium during playback, the apparatus comprising:

end support means coupled to a second end of said pickup arm remote from said stylus for restraining said remote end against vertical translatory motion while allowing said first end to move vertically;

a cleaning pad;

movable support means coupled to said cleaning pad and for supporting said cleaning pad in a position below said pickup arm whereby said cleaning pad supports said pickup arm; and reciprocating drive means coupled to said movable support means for driving said movable support means in a generally longitudinal direction relative to said pickup arm whereby during motion of said reciprocating drive means towards said stylus said cleaning pad progressively raises said stylus and wipes said stylus in a first direction, and during motion of said reciprocating drive means away from said stylus said cleaning pad wipes said stylus in a second direction and lowers said stylus.

2. The apparatus according to claim 1 wherein said movable support means and said reciprocating drive means are positioned inside said carriage.

3. The apparatus to claim 2 wherein said movable support means includes an elongated member adapted for movement within said carriage and a support arm fixedly attached to said elongated member.

4. The apparatus according to claim 3 wherein said reciprocating drive means includes electromagnetic means for providing a driving source of the movement of said elongated member.

5. The apparatus according to claim 4 wherein said electromagnetic means is positioned generally in-line with said elongated member within said carriage.

6. The apparatus according to claim 4 wherein said electromagnetic means is coupled to said elongated member via a lever arm and a spring.

* * * * *